May 19, 1964   P. E. GAIRE   3,133,713
SPINNING REEL PICKUP SAFETY DEVICE
Filed Oct. 19, 1962

INVENTOR.
PAUL E. GAIRE
BY
*Imirie and Smiley*
ATTORNEYS though which a screw, such as the screw 36 of FIG. 2,
United States Patent Office 3,133,713
Patented May 19, 1964

3,133,713
SPINNING REEL PICKUP SAFETY DEVICE
Paul E. Gaire, 153 Prospect St., Ridgewood, N.J.
Filed Oct. 19, 1962, Ser. No. 231,691
6 Claims. (Cl. 242—84.2)

This invention relates to fishing equipment and more particularly to a restraining device for use in casting with spinning reels.

The invention is more particularly concerned with a restraining device for holding the pickup arm or bail of a conventional spinning reel in an inoperative or nonwinding position during a casting operation.

Spinning reels of the prior art comprise a pickup arm or bail the function of which is to guide the line onto the spool during winding. When it is desired to cast, however, it is necessary that the pickup arm or bail be held in an inoperative or nonwinding position. Some type of latching mechanism is usually provided to hold the pickup or bail in said inoperative position. However, such latching mechanisms generally are not reliable and oftentimes prematurely release the pickup arm to a winding position. The attendant result of such a premature release of the pickup arm is a sudden termination of the unwinding of the line whereby the lure, due to its outward momentum, frequently snaps free. The lure is thus lost.

It is, accordingly, a primary object of the present invention to provide a restraining device which will hold the pickup arm or bail of a conventional spinning reel in a nonwinding or inoperative position during a casting operation.

Another object of this invention is to provide a restraining device in the form of an attachment capable of ready association with existing spinning reels for holding the pickup arm or bail thereof in an inoperative position during a casting operation.

Still further, it is an object of this invention to provide a restraining device for holding the pickup arm or bail of conventional spinning reels in a nonwinding position which is foolproof in operation and easily released.

A still further object of this invention is to provide a restraining device on spinning reels for holding the pickup arm or bail thereof in an inoperative position during a casting operation which is simple in design, economical in construction and efficient in operation.

The novel features that are considered characteristic of the present invention are set forth with particularity in the appended claims, said claims only being determinative of the scope of this invention. However, as to the invention itself, especially with regard to its organization and its method of operation, together with additional objects and advantages thereof, the same will best be understood from the following description of specific embodiments when read in conjunction with the accompanying drawing, in which:

Figure 1:
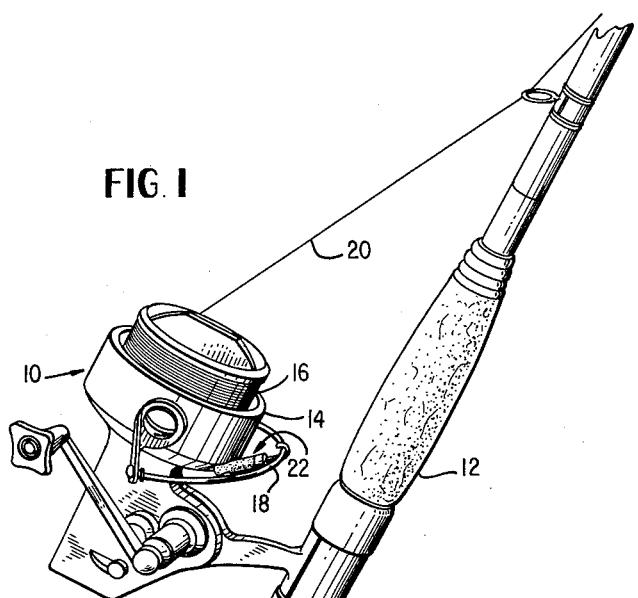
FIG. 1 is a perspective view of a conventional fishing rod and spinning reel operatively connected thereto having the restraining device of the present invention operatively associated therewith.
Figure 2:
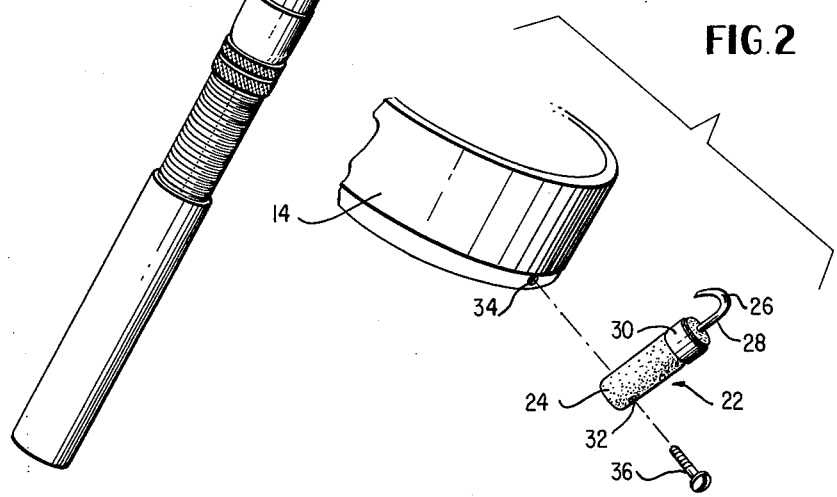
FIG. 2 is a fragmentary, exploded view in perspective of one embodiment of the present invention, drawn to an enlarged scale, showing one method of attaching the present invention to a standard form of spinning reel.
Figure 3:
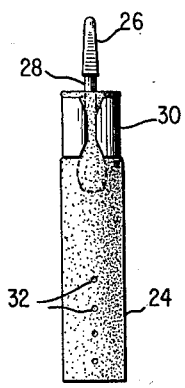
FIG. 3 is an elevational view, drawn to an enlarged scale, of the embodiment shown in FIG. 2.

Referring now in detail to the drawing, and specifically to FIGS. 1 to 3 thereof, a conventional form of spinning reel 10 is shown operatively connected to a fishing rod 12. The spinning reel 10 comprises a rotatable cup 14 and a spool 16. The cup 14 is provided with a pickup arm or bail 18 the function of which, when in an operative position, is to guide a fishing line 20 onto the spool 16. The pickup arm or bail 18 is shown, in FIG. 1, in casting position and as being held in such inoperative or nonwinding position by the restraining device of the present invention, generally indicated by reference numeral 22.

The restraining device or safety hook 22 of the present invention comprises a base portion 24 fabricated of a suitable flexible or resilient material, such as rubber or the like. A curved member or hook 26 is connected to the resilient base portion 24 in any suitable manner. For example, the base portion 24 may conveniently comprise a short section of rubber tube and have a small bore extending longitudinally therethrough into which the shank 28 of the curved member or hook 26 is positioned. A rigid metal bracket 30 constructed of any suitable material, such as sheet metal, is then clamped about the upper peripheral portion of the base 24. If desired, the shank 28 of the hook 26 may have an enlarged portion positioned on the lower end thereof so constructed and designed as to grip the wall of the bore of the resilient base portion 24 when a force is exerted tending to separate the hook 26 therefrom.

To operatively associate the restraining device or safety hook 22 of the present invention to the spinning reel 10, one or more transverse bores 32 are provided in the base portion 24. A threaded bore 34 is provided in the cup 14 of the spinner 10. The restraining device 22 may be securely associated to the cup 14 by positioning a screw 36 into one of the bores 32 and running home said screw within the threaded bore 34. By providing a plurality of the bores 32, the position of the restraining device 22 with respect to the cup 14 and pickup arm or bail 18 may be adjusted.

In use, during a casting operation when it is desired to preclude the pickup arm or bail 18 from prematurely swinging into an operative or winding position, it is merely necessary to position the hook 26 of the restraining device 22 about the bail 18. The bail 18 is thus securely held in an inoperative or nonwinding position, as clearly shown in FIG. 1. When it is desired to release the arm 18, slight pressure upon or lateral swinging of the restraining device 22 will detach it from the arm or bail 18 and permit the latter to pivot to an operative or winding position. This act of detaching the device 22 from the arm or bail 18 can be easily performed by a finger of the hand without removing the hand or hands from their normal position upon and about the spinning reel 10 and rod 12.

Figure 4:
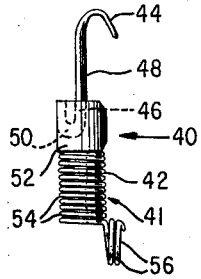
FIG. 4 is an elevational view, drawn to an enlarged scale, of a further embodiment of the present invention.

Referring now to FIG. 4, a restraining device or safety hook 40, in accordance with the present invention, is therein illustrated. The restraining device 40 comprises a base portion 41 fabricated of a coil spring 42 and a curved member or hook 44. The hook 44 is connected to the coil spring 42 in any suitable manner. For example, the lower end 46 of the shank 48 of the hook 44 may be turned upwardly, as indicated in dotted lines at 50, and hooked within the spring 42. A bracket 52 is then positioned and clamped about the upper end of the spring 42.

The spring 42 comprises a plurality of convolutions 54. One or more of the lowermost of such convolutions are positioned at an angle with respect to the remainder of such convolutions to form a screw or bolt eye 56. The center of such eye 56 provides a bore through which a screw, such as the screw 36 of FIG. 2, may be inserted for mounting the restraining device 40 on the cup 14.

In use, the restraining device disclosed in FIG. 4, operates in substantially the same manner as does the embodiment disclosed in FIGS. 1 to 3 described supra, the former being equally applicable to the spinning reel 10 in place of the latter.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A spinning reel comprising, in combination, a rotatable cup, a spool positioned on said cup, a pickup arm pivotally positioned upon said cup for guiding a line upon and about said spool during the winding thereof, and flexible restraining means positioned upon the external periphery of said cup for holding said pickup arm in an inoperative position whereby said pickup arm is precluded from prematurely pivoting into an operative position in which said arm guides said line about said spool.

2. In the assembly as defined in claim 1, wherein said restraining means comprises a base portion fabricated of a resilient material, and a curved member operatively associated with said resilient base portion.

3. In the assembly as defined in claim 2, wherein said restraining means further comprises means for adjustably positioning said restraining means on said cup.

4. In the assembly as defined in claim 1, wherein said flexible restraining means comprises a base portion fabricated of a coil spring, and a curved member operatively associated with said base portion.

5. In the assembly as defined in claim 3, wherein at least one of the convolutions of said spring are positioned at an angle with respect to the remainder thereof whereby the restraining means may be removably positioned upon said cup.

6. A spinning reel according to claim 1 wherein said restraining means comprises a flexible base portion fabricated of a short length of rubberlike tube, and a hook for engaging a pickup arm and having a shank with an enlargement thereon and inserted in and secured thereby to one end of said tube, said tube having at least one hole diametrically therethrough and receiving fastening means mounting said restraining device on said cup.

References Cited in the file of this patent

UNITED STATES PATENTS

| | | |
|---|---|---|
| 84,498 | Little | Dec. 1, 1868 |
| 309,116 | Wenzel | Dec. 9, 1884 |
| 1,168,771 | Weatherley | Jan. 18, 1916 |
| 1,478,955 | Harrison et al. | Dec. 25, 1923 |
| 1,578,817 | Fischer | Mar. 30, 1926 |
| 2,713,463 | Sarah | July 19, 1955 |
| 2,852,205 | Beger | Sept. 16, 1958 |
| 3,027,113 | Berger et al. | Mar. 27, 1962 |
| 3,045,942 | Henze | July 24, 1962 |